(12) United States Patent
Subbarao et al.

(10) Patent No.: US 10,771,283 B2
(45) Date of Patent: Sep. 8, 2020

(54) VIRTUAL CLOUD NODE

(71) Applicant: SAP SE, Walldorf (DE)

(72) Inventors: Chandrashekar Kanakapura Subbarao, Bangalore (IN); Srinath K, Bangalore (IN)

(73) Assignee: SAP SE, Walldorf (DE)

( * ) Notice: Subject to any disclaimer, the term of this patent is extended or adjusted under 35 U.S.C. 154(b) by 31 days.

(21) Appl. No.: 16/029,190

(22) Filed: Jul. 6, 2018

(65) Prior Publication Data

US 2020/0014555 A1  Jan. 9, 2020

(51) Int. Cl.
| | |
|---|---|
| *H04L 12/46* | (2006.01) |
| *H04L 29/06* | (2006.01) |
| *H04L 12/24* | (2006.01) |
| *H04L 29/08* | (2006.01) |

(52) U.S. Cl.
CPC .......... *H04L 12/46* (2013.01); *H04L 41/0273* (2013.01); *H04L 69/08* (2013.01); *H04L 41/0233* (2013.01); *H04L 67/02* (2013.01)

(58) Field of Classification Search
CPC ..... H04L 12/46; H04L 69/08; H04L 41/0273; H04L 67/02; H04L 41/0233; H04L 29/06068; H04L 29/06095; H04L 29/06163; H04L 29/06183; H04J 14/0223
USPC ........................................................ 370/466
See application file for complete search history.

(56) References Cited

U.S. PATENT DOCUMENTS

| | | | |
|---|---|---|---|
| 8,443,438 B1* | 5/2013 | Sharir .................... | H04L 67/02 380/258 |
| 9,213,581 B2 | 12/2015 | Klemba et al. | |
| 9,336,060 B2 | 5/2016 | Nori et al. | |
| 9,342,357 B2 | 5/2016 | Grueneberg et al. | |
| 9,658,868 B2 | 5/2017 | Hill | |
| 10,387,640 B2* | 8/2019 | Sharma .................. | G06F 21/44 |
| 2003/0074485 A1* | 4/2003 | Zhdankin ............... | G06F 9/465 719/316 |
| 2008/0301225 A1* | 12/2008 | Kamura .................. | G06F 21/53 709/203 |
| 2012/0151372 A1* | 6/2012 | Kominac ............ | H04L 67/2823 715/740 |
| 2013/0142201 A1 | 6/2013 | Kim et al. | |
| 2013/0166602 A1 | 6/2013 | Brunswig et al. | |
| 2014/0149592 A1* | 5/2014 | Krishna .................. | G06F 1/329 709/226 |
| 2014/0201381 A1* | 7/2014 | Shimizu .............. | H04L 67/2823 709/230 |
| 2014/0298419 A1* | 10/2014 | Boubez .................. | H04L 63/08 726/4 |
| 2014/0304804 A1 | 10/2014 | Lee et al. | |

(Continued)

*Primary Examiner* — Robert J Lopata
(74) *Attorney, Agent, or Firm* — Jones Day

(57) ABSTRACT

Data packets are received by a virtual cloud node from a cloud server. The virtual cloud node is one of a plurality of computing nodes forming part of an on-premise computing environment. Each of the computing nodes include at least one computing device and executed a plurality of servers with one of the servers being a central management server. Thereafter, the virtual cloud node converts the data packets from a first protocol compatible with the cloud server to a second protocol. The central management server routes the converted data packets to another one of the computing nodes for processing or consumption. Related apparatus, systems, techniques and articles are also described.

20 Claims, 4 Drawing Sheets

(56) References Cited

U.S. PATENT DOCUMENTS

| | | | | |
|---|---|---|---|---|
| 2014/0366155 A1* | 12/2014 | Chang | ................... | G06F 21/10 |
| | | | | 726/27 |
| 2015/0227406 A1* | 8/2015 | Jan | ....................... | G06F 11/079 |
| | | | | 714/37 |
| 2015/0229638 A1* | 8/2015 | Loo | ..................... | H04L 63/029 |
| | | | | 726/9 |
| 2015/0295760 A1* | 10/2015 | McBride | ............. | H04L 41/5051 |
| | | | | 370/254 |
| 2015/0341445 A1 | 11/2015 | Nikolov et al. | | |
| 2016/0092339 A1* | 3/2016 | Straub | ................ | G06F 9/44521 |
| | | | | 717/124 |
| 2016/0177546 A1* | 6/2016 | Cregg | ................ | H04L 12/6418 |
| | | | | 700/282 |
| 2016/0183030 A1* | 6/2016 | Cregg | .................... | H04W 4/70 |
| | | | | 455/500 |
| 2016/0241513 A1 | 8/2016 | Sridharan et al. | | |
| 2018/0083915 A1* | 3/2018 | Medam | ............... | H04L 63/0815 |
| 2018/0227369 A1* | 8/2018 | DuCray | ............. | H04L 12/2803 |
| 2018/0288179 A1* | 10/2018 | Bhatia | .................. | H04L 45/00 |
| 2018/0338002 A1* | 11/2018 | Sherrill | ................... | H04L 67/12 |
| 2018/0351761 A1* | 12/2018 | Li | ........................ | H04L 12/281 |
| 2018/0375762 A1* | 12/2018 | Bansal | .................... | H04L 45/74 |
| 2019/0089607 A1* | 3/2019 | Jain | ...................... | H04L 43/065 |
| 2019/0182137 A1* | 6/2019 | Debnath | ............ | H04L 43/0876 |

\* cited by examiner

VIRTUAL CLOUD NODE

TECHNICAL FIELD

The subject matter described herein relates to a hybrid computing environment in which an on-premise computing environment includes a virtual cloud node that interfaces with a cloud server.

BACKGROUND

Despite the trend towards dedicated cloud computing environments, on-premise computing installations remain important as they allow customers to have complete control over their computing resources and, additionally, in some cases, allow for greater protection from cyber-attacks. Such on-premise installations typically include a distributed setup of many software-based servers distributed across multiple physical machines (i.e., computing devices, etc.). Each of these physical machines is referred to as a node and a group of nodes is referred to as a cluster.

SUMMARY

In one aspect, data packets are received by a virtual cloud node from a cloud server. The virtual cloud node is one of a plurality of computing nodes forming part of an on-premise computing environment. Each of the computing nodes include at least one computing device and executed a plurality of servers with one of the servers being a central management server. Thereafter, the virtual cloud node converts the data packets from a first protocol compatible with the cloud server to a second protocol. The central management server routes the converted data packets to another one of the computing nodes for processing or consumption.

The servers executed by the computing nodes can be operating system processes.

The first protocol can be Simple Object Access Protocol (SOAP). The second protocol can be Common Object Request Broker Architecture (CORBA). The received data packets can be transported via Hypertext Transfer Protocol (HTTP) from the cloud to the virtual cloud node.

Data packets intended for the cloud server can be received by the virtual cloud node from the central management server. The virtual cloud can convert the data packets from the second protocol to the first protocol compatible with the cloud server. The virtual cloud node can transmit the converted data packets in the first protocol to the cloud server. The virtual cloud node can include a cloud connector that converts the data packets from the second protocol to the first protocol compatible with the cloud server.

The cloud server can include an adaptive processing server hosting a plurality of services utilizing the first protocol.

The virtual cloud node can include an endpoint server for receiving the data packets from the cloud server and for transmitting data packets to the cloud server.

The virtual cloud node can include an address mapper server which includes location information for each server on other nodes that is used to route the converted data packets.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter allows for a hybrid computing environment which leverages the technical advantages of an on-premise solution (e.g., control, security, etc.) with the scalability (e.g., computing power, storage, etc.) offered by cloud computing environments without fundamentally changing the operation of the on-premise solution.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to an arrangement in which a cloud (i.e., remote servers hosted on the Internet to store, manage, and process data, etc.) can also be treated virtually as a physical node to allow an on-premise computing installation to be seamlessly extended to the cloud. As will be described in further detail below, a virtual cloud node (VCN) is provided that can run on-premise (i.e., be executed on a locally installed physical machine) and have all the intelligence required to make the cloud to on-premise communication transparent and seamless. The virtual cloud node acts like a proxy and a language bridge between the cloud and on-premise.

Figure 1:
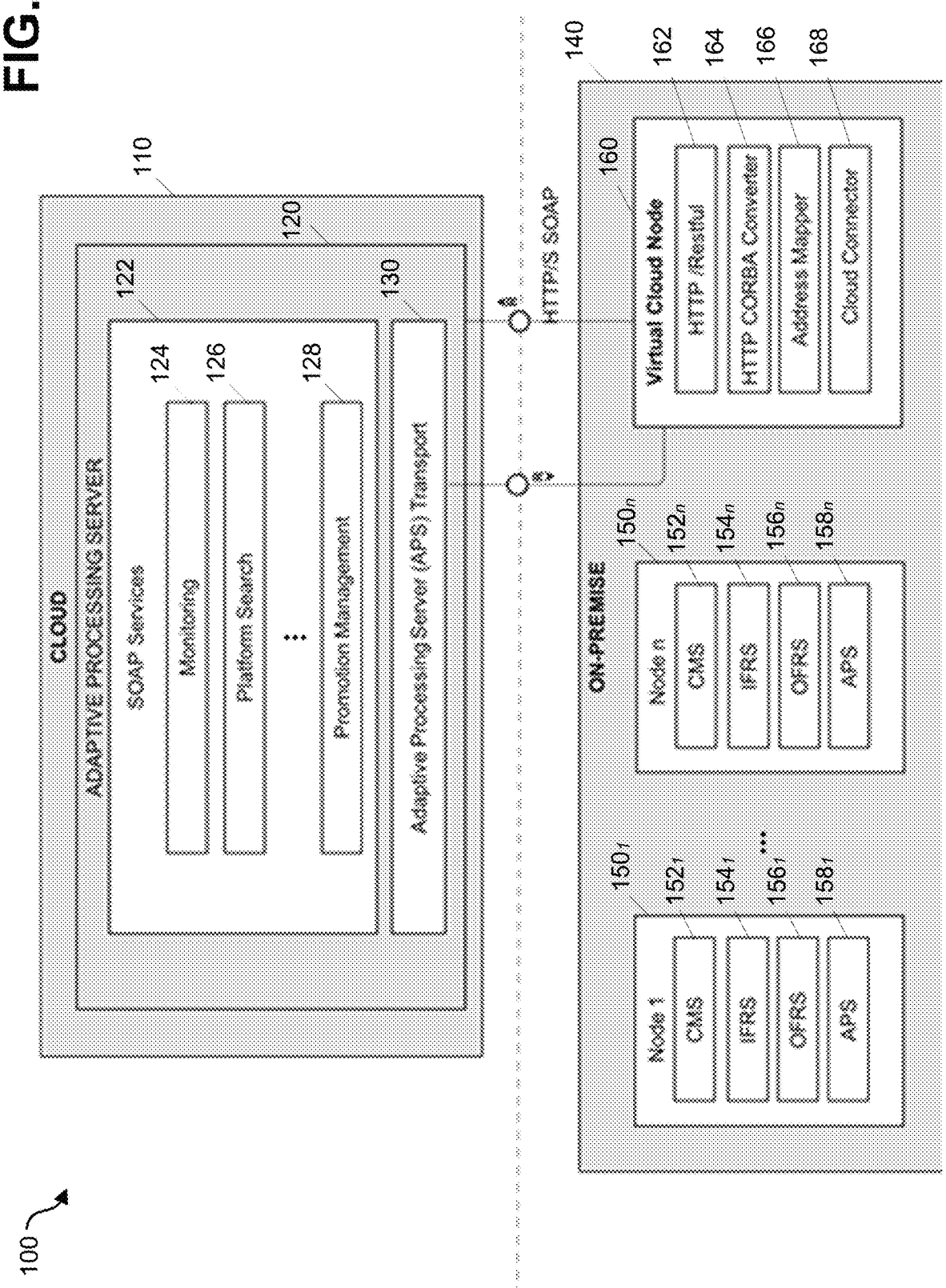
FIG. 1 is a diagram illustrating a hybrid computing environment including a cloud server and a series of on-premise computing nodes.

FIG. 1 is a diagram 100 illustrating a hybrid computing architecture having a cloud computing environment 110 (sometimes referred herein as "cloud") and an on-premise computing environment 140 (sometimes referred to herein as "on-premise"). The cloud 110 can include an adaptive processing server 120 that executes a plurality of Simple Object Access Protocol (SOAP) services 122 including monitoring 124, searching 126, promotion management 128 and the like. All of the services 124-128 can have web service endpoints and can communicate over HTTP-SOAP. With some on-premise installations, the adaptive processing server 120 can convert the webservice HTTP-SOAP to CORBA (this conversion need not be done in the cloud).

The monitoring service 124 can be a service that monitors a large number of metrics that the installation surfaces. Metrics can include, for example, OS metrics such as CPU usage, memory used/available, disk space, etc. The metrics could also relate to factors such as size of a job queue, number of users logged in (sessions), number of documents open, number of database connections, etc. The monitoring service 124 can also allow thresholds to be set and for notifications to be generated when there is a breach.

The searching service 126 can primarily run an indexing job and index metadata (such as objectID, object name, object type, owner, etc.) of all artifacts (e.g., documents) in the repository and also the corresponding document content. In other words, the searching service 126 enables an optimized metadata and content search of the entire repository and the documents.

The promotion management service 128 can be a lifecycle management service which can allow and support moving and syncing content and repositories from one landscape to another. A typical use case for the promotion management service 128 is between a test landscape to a production landscape.

Furthermore, the cloud 110 can include an adaptive processing server transport 130 which acts as a communication interface with the on-premise computing environment 140. It will be appreciated that the current subject matter can be utilized with varying protocols beyond SOAP and CORBA depending on the desired implementation.

The on-premise computing environment 140 can include a plurality of nodes $150_1 \ldots 150_n$ each having a plurality of servers $152_1 \ldots 158_n$. Servers, in this regard and unless otherwise specified, refer to operating system processes not physical machines. The on-premise computing environment 140 can further include a virtual cloud node 160 which includes various computing modules 162, 164, 166, 168.

The architecture of FIG. 1 can be used for a variety of software applications requiring an on-premise installation but having a distributed setup of many servers which can be distributed across multiple physical machines. In such a distributed setup, the application can be installed on all the physical nodes $150_{1 \ldots n}$ to form a cluster. A cluster, in this regard, can refer to a system with multiple Central Management Servers (CMS) $152_{1 \ldots n}$ that work together by sharing a common file repository and a central database/repository. Each CMS server $152_{1 \ldots n}$ is typically on its own physical machine or node.

The CMS servers $152_{1 \ldots n}$ can provide core functions like authentication, authorization, communication orchestration between servers, database connectivity, a SQL-like query service, job scheduling, etc. The CMS servers $152_{1 \ldots n}$ can have a list centrally of all the servers in the installation, the state of servers (running, stopped, failed, etc.) and they can also work as load balancers. The CMS servers $152_{1 \ldots n}$ communicate over CORBA although other languages could be utilized such as JAVA or C++ implementations. It is possible to custom install any combination of servers on a node, but every node $150_{1 \ldots n}$ must have at least one CMS server $152_{1 \ldots n}$.

The other servers $154\text{-}8_{1 \ldots n}$ on the nodes $150_{1 \ldots n}$ can, in some cases, communicate with a central CMS (either on one of the nodes $150_{1 \ldots n}$ or as part of a separate computing device). When there are multiple CMS servers $152_{1 \ldots n}$ only one can take requests (which is helpful for failover scenarios as opposed to load balancing).

Figure 2:
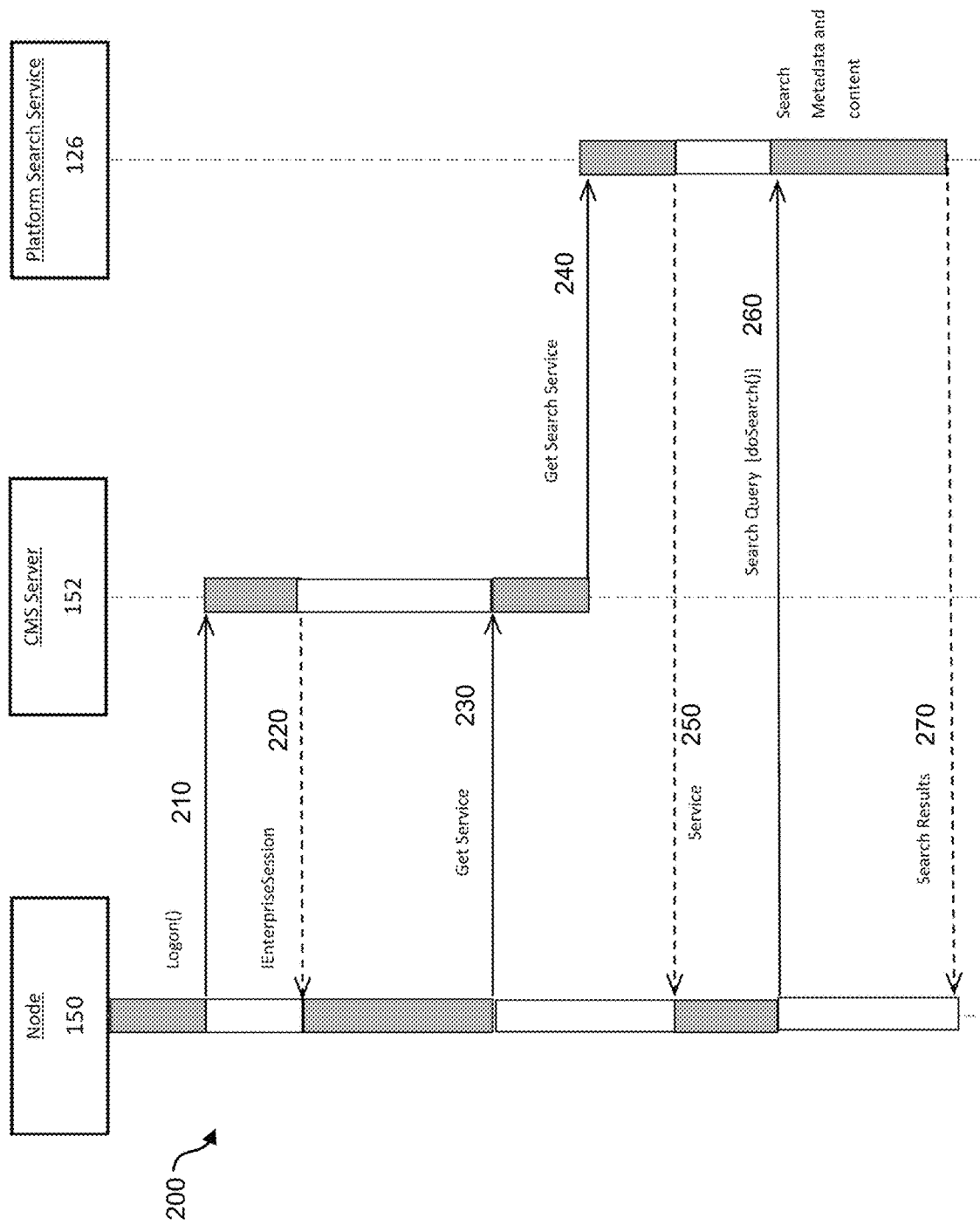
FIG. 2 is a sequencing diagram illustrating communications among a node, a central management server and a platform search service.

FIG. 2 is a sequence diagram 200 which illustrates signaling among a node 150, a CMS server 152, and a platform search service 126. With this arrangement, all service and API invocations can be via the CMS server 152. All APIs can always be invoked over an enterpriseSession and goes via the CMS server 152. The software development kit (SDK) can be used as follows. Initially, at 210, the node 150 logins to the CMS server 152 and, at 220, gets a SessionObject. Session ses=Enteprise.logon("userid", "pwd", "CMSNAME","corba port"). Subsequently, at 230, the service handle of the desired service is requested. This request is forwarded by the CMS 152, at 240, to the platform search service 126, so that, at 250, the platform search service 126 returns the service to the node 150. SearchSvc searcSvc=session.getService("Search"); //taking search service as an example. Later, at 260, the API can be invoked on the service handle. SearchSvc.doSearch("ABC","WebIntelligence"); //. Search results are provided, at 270, in response.

Servers and services running on the servers can implement their own APIs. In the above example, the search service has an API called searchSvc.doSearch("<strForSearch>", "documentType") used as searchSvc.doSearch("ABC","WebIntelligence"). Every such API invocation using the session (as got in first step) in fact goes via the CMS 152. Therefore, in a clustered environment having multiple instances of 'search service', the CMS 152 can choose to load balance between these instances. In addition to load balancing, the CMS 152 can also perform reroutes in a failover scenario.

In the example of FIG. 2, the search service can be a service (e.g., platform search 126) that is housed in the adaptive processing server 120. But, this APS is abstracted out in the SDK usage and the client using the SDK need not even be aware of the fact that the search is an APS service. Now, extending the same to the VCN proposed here, an APS 120 can be deployed on the cloud and it is this VCN that will make this APS 120 instance transparently available to the CMS 152 and thereby to the nodes 150 that want to invoke services on it.

For example, for a WINDOWS operating system installation, there can be a CMS.exe for CentralManagementServer, an InputFileRepositoryServer.exe for InputFileRepositoryServer, an OutputFileRepositoryServer.exe for OutputFileRepositoryServer, a java.exe for AdaptiveProcessingServer, another java.exe for AdaptiveJobServer, etc. IFRS 154 and OFRS 156 are platform abstractions to the actual FileStore. FileStore refers to the actual disk directories where the report/document files are saved. Any file operations like saving documents/reports and saving system-generated document/reports as a result of scheduled jobs can use the IFRS 154 and the OFRS 156. Any file that is created by the system like scheduled reports are kept in the OFRS 156, while all other reports/documents are saved in the IFRS 154. The FileRepository servers importantly provide the SDK interfaces for listing the files on the server, for querying the size of a file, querying the size of the entire file repository, adding files to the repository and deleting files from the repository. A JobServer can run a scheduled job like a publication of a report.

As mentioned above, the virtual cloud node 160 can be treated like a physical node in a distributed computing system architecture. The virtual cloud node 160 can include, for example, four components (it will be appreciated that the VCN 160 can also include other components/servers, etc.). A first component 162 can be an HTTP-CORBA converter which can convert CORBA (Common Object Request Broker Architecture) messages to SOAP and vice versa. HTTPbased payloads can be SOAP packets which can be marshalled into CORBA and vice-versa. Then, these SOAP packets can go over HTTP/S connections directly to and from the cloud services (i.e., SOAP services 124-128).

A second component 164 can be an HTTP(s) endpoint such as a restful end point or a servlet which can act as the single end-point for communication on-premise. Such HTTP endpoint can be mapped in the cloud connector 168.

An address mapper 168 can be a server providing addressing and address mapping in the VCN 160. With some implementations, some or all servers 150-158$_1$ ... 150-158$_n$ can have a unique identifier such as Interoperable Object Reference (IOR), the locator string for a server. Every server 150-158$_1$ ... 150-158$_n$ can register itself with the CMS with this IOR. In the cloud case, when the adaptive processing server 120 is running on the cloud 110, IOR is not needed as the CMS 152 and the cloud service 110 cannot communicate with each other directly. The VCN 160 can proxy for the cloud 110 and have an internal address mapping to the cloud server. The CMS just continues to think as if its working with another server on another (physical) node.

A cloud connecter 168 can allow trusted connection from/to the cloud 110. The cloud connecter 168 can act as a reverse proxy to the on-premise processes. The VCN 160 can have configurations in the cloud connector 168 that is required to map the HTTP services.

In some variations, cloud scripts (e.g., JAVA-based processes, etc.) can be utilized to help deploy the adaptive processing server 120 as a cloud service. There will be certain changes required in the same servers when deployed on the cloud. Cloud platforms, as provided herein, can allow deployment and management of services via command line or through CLI scripts. For example, in a cloud foundry environment, BOSH(-lite) scripts are typically used. These scripts allow for interaction with the cloud platform to occur in an authenticated, secure way. Similar to how a new server or a server-clone can be created on an on-premise node, the server instance can be created using these scripts on the cloud.

Also, additionally, the JAVA server (APS 120) can itself take some special arguments such as DISRUNNINGONCLOUD=true—a system property setting that can be passed to the JAVA VM which will alter the way the APS 120 runs (i.e., the APS 120 can shut-off the SOAP-HTTP to CORBA conversion which is not required on cloud, etc.).

As referenced above, all communication can be routed through the Central Management Server (CMS) 152 which utilizes CORBA (for example, using a C++ implementation). The Adaptive Processing Server (APS) 120 can be a JAVA-based server. The APS 120 can host a large number of services and can be characterized as being similar to a server-container for services written in JAVA. These services can be HTTP-SOAP-based implementations (i.e., the APS 120 can host a number of services which communicate via HTTP-SOAP, etc.). The APS 120 can provide that such se SOAP packets are converted to CORBA. However, in a cloud scenario CORBA can be used directly on the cloud directly because typically clouds allows only HTTP(S).

In some implementations, the various services 124, 126, 128 hosted on the APS 120 can use HTTP-SOAP. Instead of converting SOAP from the APS 120 services, the SOAP packets are sent directly from the APS 120 over HTTP. These SOAP packets sent over HTTP from the APS 120 are received by the end point 162 of the VCN 160. The endpoint 160 can be in the same network or connected installation as where the CMS 152 is hosted (i.e., the HTTP server 162 can reach the CMS 152 via an SDK using the hostname of the CMS 152). As will be noted, with this arrangement, instead of having conversion logic in the APS 120, such conversion logic can reside in the VCN 160. The HTTP CORBA converter 164, in one example, can convert SOAP packets to CORBA packets and then transmit the resulting CORBA packets to the CMS 152. The HTTP CORBA converter 164 can also operate in the opposite direction, namely to convert CORBA to SOAP-HTTP and transmit them over the Internet to be read and understood by the services 124-128 of the APS 120 services which is hosted in the cloud 110.

Figure 3:
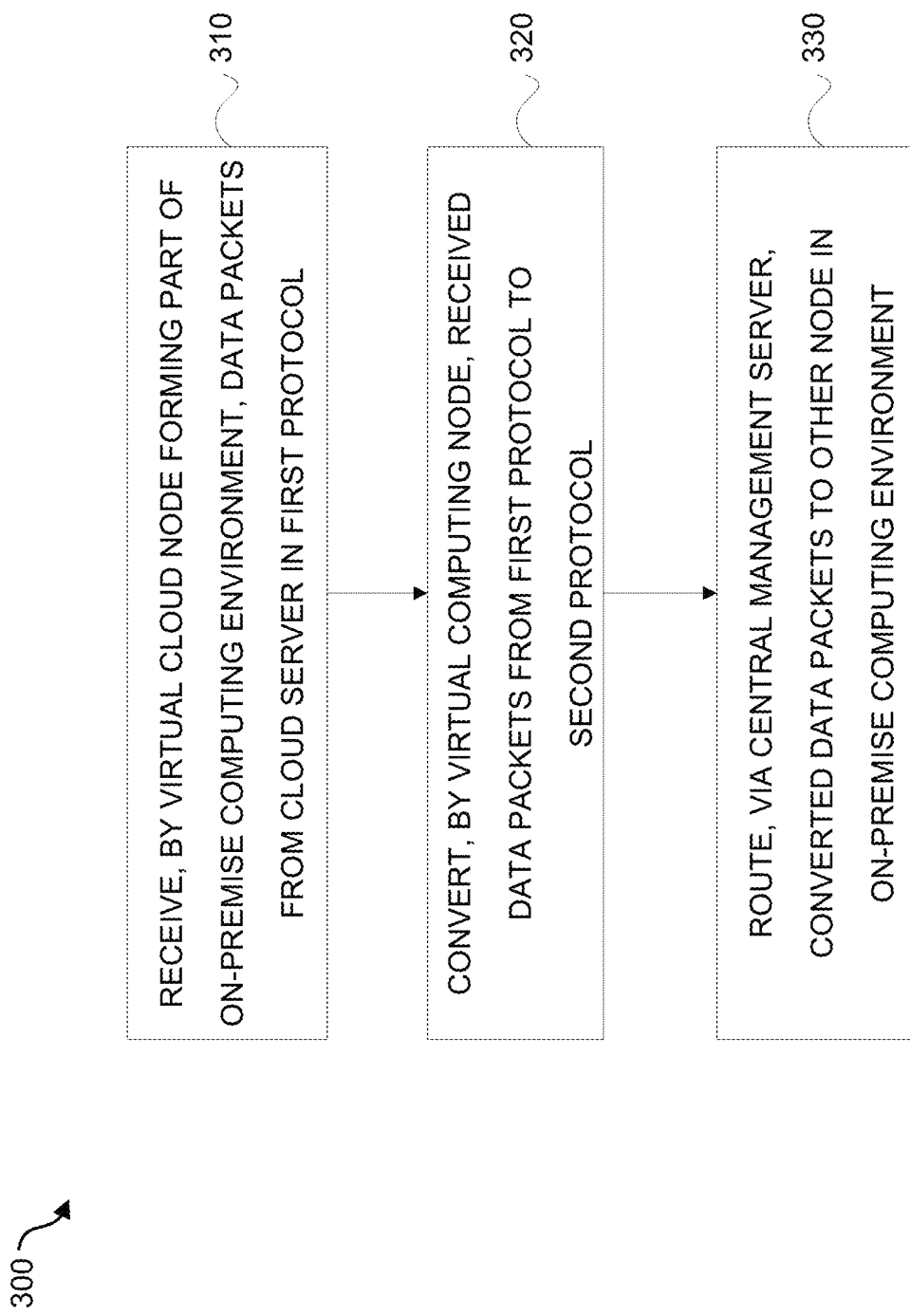
FIG. 3 is a process flow diagram illustrating processing of data in a hybrid computing environment.

FIG. 3 is a process flow diagram 300 illustrating an arrangement in which, at 310, data packets are received by a virtual cloud node from a cloud server. The virtual cloud node is one of a plurality of computing nodes forming part of an on-premise computing environment with each of the computing nodes comprising at least one computing device that each executes one or more servers. At least one of the servers can be a central management server. The virtual cloud node then, at 320, converts the received data packets from a first protocol compatible with the cloud server to a second protocol. The converted data packets are then routed, via the central management server at 330, to another one of the computing nodes for processing or consumption.

Figure 4:
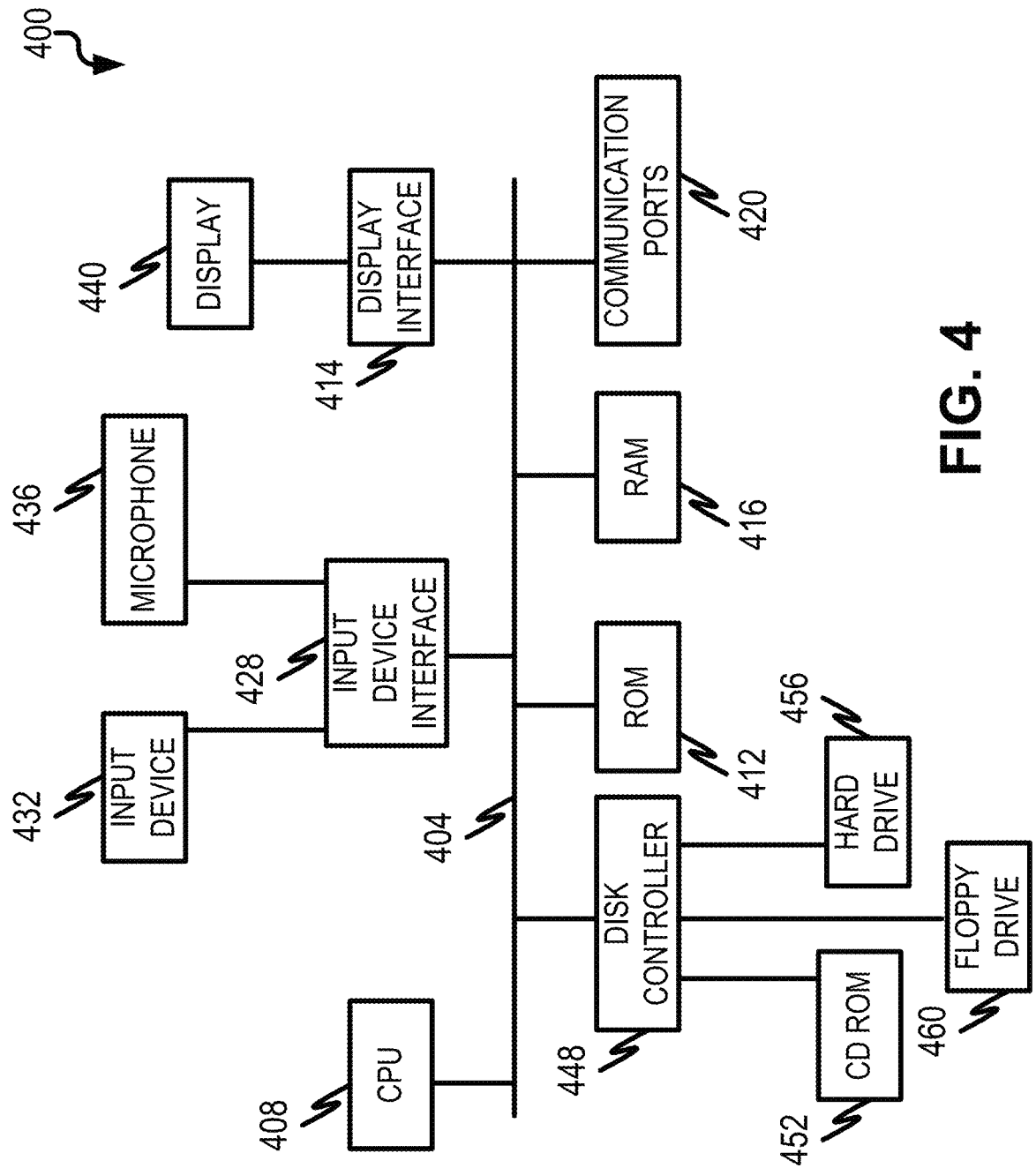
FIG. 4 is a diagram illustrating a sample computing device for implementing aspects described herein.

FIG. 4 is a diagram 400 illustrating a sample computing device architecture for implementing various aspects described herein. A bus 404 can serve as the information highway interconnecting the other illustrated components of the hardware. A processing system 408 labeled CPU (central processing unit) (e.g., one or more computer processors/data processors at a given computer or at multiple computers), can perform calculations and logic operations required to execute a program. A non-transitory processor-readable storage medium, such as read only memory (ROM) 412 and random access memory (RAM) 416, can be in communication with the processing system 408 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 448 can interface one or more optional disk drives to the system bus 404. These disk drives can be external or internal floppy disk drives such as 460, external or internal CD-ROM, CD-R, CD-RW or DVD, or solid state drives such as 452, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the communication port 420 includes or otherwise comprises a network interface.

To provide for interaction with a user, the subject matter described herein can be implemented on a computing device having a display device 440 (e.g., a CRT (cathode ray tube) or LCD (liquid crystal display) monitor, etc.) for displaying information obtained from the bus 404 to the user and an input device 432 such as keyboard and/or a pointing device (e.g., a mouse or a trackball) and/or a touchscreen by which the user can provide input to the computer. Other kinds of input devices 432 can be used to provide for interaction with a user as well; for example, feedback provided to the user can be any form of sensory feedback (e.g., visual feedback, auditory feedback by way of a microphone 436, or tactile feedback); and input from the user can be received in any form, including acoustic, speech, or tactile input. In the input device 432 and the microphone 436 can be coupled to and convey information via the bus 404 by way of an input device interface 428. Other computing devices, such as dedicated servers, can omit one or more of the display 440 and display interface 414, the input device 432, the microphone 436, and input device interface 428.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A hybrid cloud computing method comprising:
receiving, by a virtual cloud node, data packets from a cloud server, the virtual cloud node being one of a plurality of computing nodes forming part of an on-premise computing environment executing on-premise processes, each of the computing nodes comprising at least one computing device and executing a plurality of servers, one of the servers being a central management server;
converting, by the virtual cloud node, the data packets from a first protocol compatible with the cloud server to a second protocol; and
routing, via the central management server, the converted data packets to another one of the computing nodes for processing or consumption;
wherein the virtual cloud node comprises components including:
an HTTP-CORBA converter that convert CORBA (Common Object Request Broker Architecture) format messages to SOAP (Simple Object Access Protocol) format messages and vice versa;
an HTTP endpoint that acts as a single endpoint for on-premise communications
an address mapper providing addressing and address mapping in the virtual cloud node; and
a cloud connector allowing trusted connections to and from the cloud server and acting as a reverse proxy to the on-premise processes.

2. The method of claim 1, wherein the servers executed by the computing nodes are operating system processes.

3. The method of claim 1, wherein the first protocol is Simple Object Access Protocol (SOAP).

4. The method of claim 3, wherein the second protocol is Common Object Request Broker Architecture (CORBA).

5. The method of claim 4, wherein the received data packets are transported via Hypertext Transfer Protocol (HTTP) from the cloud to the virtual cloud node.

6. The method of claim 1 further comprising:
receiving, by the virtual cloud node from the central management server, data packets intended for cloud server;
converting, by the virtual cloud node, the data packets from the second protocol to the first protocol compatible with the cloud server; and
transmitting, by the virtual cloud node, the converted data packets in the first protocol to the cloud server.

7. The method of claim 1, wherein the cloud server comprises an adaptive processing server hosting a plurality of services utilizing the first protocol.

8. The method of claim 1, wherein the virtual cloud node comprises an endpoint server for receiving the data packets from the cloud server and for transmitting data packets to the cloud server.

9. The method of claim 1, wherein the virtual cloud node comprises an address mapper server which includes location information for each server on other nodes that is used to route the converted data packets.

10. A hybrid cloud computing system comprising:
at least one programmable data processor; and
memory storing instructions which, when executed by the at least one programmable data processor, result in operations comprising:
receiving, by a virtual cloud node, data packets from a cloud server, the virtual cloud node being one of a plurality of computing nodes forming part of an on-premise computing environment executing on-premise processes, each of the computing nodes comprising at least one computing device and executing a plurality of servers, one of the servers being a central management server;
converting, by the virtual cloud node, the data packets from a first protocol compatible with the cloud server to a second protocol; and
routing, via the central management server, the converted data packets to another one of the computing nodes for processing or consumption;
wherein the virtual cloud node comprises components including:
an HTTP-CORBA converter that convert CORBA (Common Object Request Broker Architecture) format messages to SOAP (Simple Object Access Protocol) format messages and vice versa;
an HTTP endpoint that acts as a single endpoint for on-premise communications;
an address mapper providing addressing and address mapping in the virtual cloud node; and
a cloud connector allowing trusted connections to and from the cloud server and acting as a reverse proxy to the on-premise processes.

11. The system of claim 10, wherein the servers executed by the computing nodes are operating system processes.

12. The system of claim 10, wherein the first protocol is Simple Object Access Protocol (SOAP).

13. The system of claim 12, wherein the second protocol is Common Object Request Broker Architecture (CORBA).

14. The system of claim 13, wherein the received data packets are transported via Hypertext Transfer Protocol (HTTP) from the cloud to the virtual cloud node.

15. The system of claim 10, wherein the operations further comprise:
receiving, by the virtual cloud node from the central management server, data packets intended for cloud server;
converting, by the virtual cloud node, the data packets from the second protocol to the first protocol compatible with the cloud server; and
transmitting, by the virtual cloud node, the converted data packets in the first protocol to the cloud server.

16. The system of claim 10, wherein the cloud server comprises an adaptive processing server hosting a plurality of services utilizing the first protocol.

17. The system of claim 10, wherein the virtual cloud node comprises an endpoint server for receiving the data packets from the cloud server and for transmitting data packets to the cloud server;
wherein the virtual cloud node comprises an address mapper server which includes location information for each server on other nodes that is used to route the converted data packets.

18. A non-transitory computer program product storing instructions which, when executed by at least one programmable data processor forming part of at least one computing device, result in operations comprising:
receiving, by a virtual cloud node, data packets from a cloud server, the virtual cloud node being one of a plurality of computing nodes forming part of an on-premise computing environment executing on-premise processes, each of the computing nodes comprising at least one computing device and executing a plurality of servers, one of the servers being a central management server;
converting, by the virtual cloud node, the data packets from a first protocol compatible with the cloud server to a second protocol; and
routing, via the central management server, the converted data packets to another one of the computing nodes for processing or consumption;
wherein the virtual cloud node comprises components including:
an HTTP-CORBA converter that convert CORBA (Common Object Request Broker Architecture) format messages to SOAP (Simple Object Access Protocol) format messages and vice versa;
an HTTP endpoint that acts as a single endpoint for on-premise communications;
an address mapper providing addressing and address mapping in the virtual cloud node; and
a cloud connector allowing trusted connections to and from the cloud server and acting as a reverse proxy to the on-premise processes.

19. The non-transitory computer program product of claim 18, wherein the servers executed by the computing nodes are operating system processes.

20. The non-transitory computer program product of claim 19, wherein the operations further comprise:
receiving, by the virtual cloud node from the central management server, data packets intended for cloud server;
converting, by the virtual cloud node, the data packets from the second protocol to the first protocol compatible with the cloud server; and transmitting, by the virtual cloud node, the converted data packets in the first protocol to the cloud server.

\* \* \* \* \*